2 Sheets—Sheet 1.

T. F. ROWLAND.

Gas-Retort.

No. 8,815. Reissued July 22, 1879.

Witnesses:

Geo. W. Miatt

S. F. Sullivan

Inventor:

Thomas F. Rowland

By his Attorney

E. N. Dickerson Jr.

N. PETERS, PHOTO-LITHOGRAPHER, WASHINGTON, D. C.

T. F. ROWLAND.
Gas-Retort.

No. 8,815. Reissued July 22, 1879.

Witnesses:

Geo. W. Miatt

S. F. Sullivan

Inventor:

Thomas F. Rowland

By his Attorney

E. N. Dickerson Jr.

N. PETERS, PHOTO-LITHOGRAPHER, WASHINGTON, D. C.

UNITED STATES PATENT OFFICE.

THOMAS F. ROWLAND, OF NEW YORK, N. Y.

IMPROVEMENT IN GAS-RETORTS.

Specification forming part of Letters Patent No. 211,591, dated January 21, 1879; Reissue No. 8,815, dated July 22, 1879; application filed March 1, 1879.

*To all whom it may concern:*

Be it known that I, THOMAS F. ROWLAND, of the city, county, and State of New York, have invented a new and useful Improvement in Gas-Fixing Retorts, of which the following is a full, true, and exact description, reference being had to the accompanying drawings.

My invention has reference to those processes of gas manufacture in which a vapor is converted into gas by being passed through a highly-heated retort, called a "fixing-retort," and is designed to facilitate the removal or cleaning of these retorts separately without disturbing their operation as a whole, and also to allow of the escape of explosive impurities before they enter the heating-retorts, thereby preventing the injury or destruction of the apparatus.

Owing to the very high temperature at which these retorts are maintained, it frequently happens that they are burned out and destroyed, and it has been necessary to stop the mechanism until the retort could be replaced.

My invention has for its object the shutting off of the currents of gas from the retort which it is desired to replace, while the other retorts of the series are allowed to operate.

Figure 1:
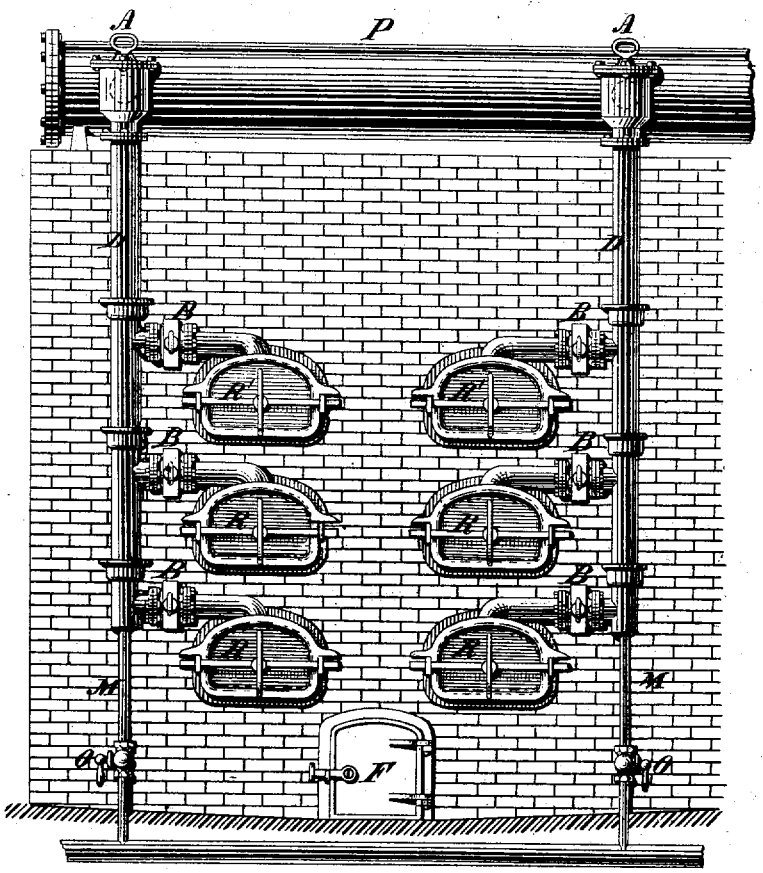
Figure 2:
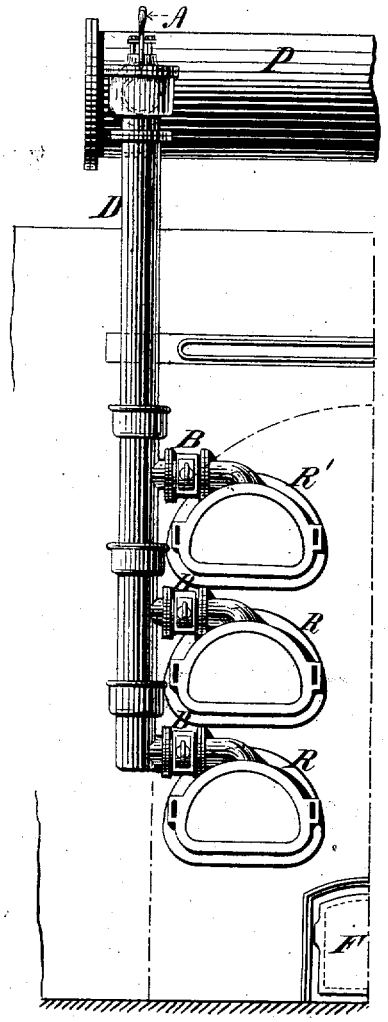
Figure 3:
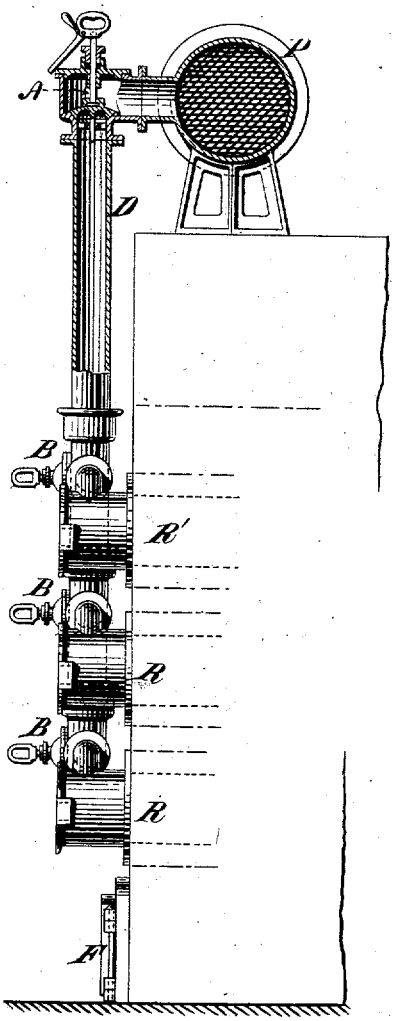

In my drawings, Figure 1 represents a front elevation, showing a bench of retorts set in brick. Fig. 2 shows a section through the front end of one series of retorts. Fig. 3 shows a section, at right angles to the section at Fig. 2, through the supply-pipe P and valve A.

The retorts forming each bench are heated from a central furnace. The pipe P is connected at intervals with the stand-pipes D, each communicating with the vertical series of retorts. Each of these pipes D is provided with a valve, A, at its upper extremity, whereby it can be shut off from the supply-pipe P.

The stand-pipes D are connected to the ends of the retort by the short pipes. (Shown clearly in Fig. 2.) Each of these pipes is provided with a valve, B.

At the bottom of the pipes D are the escape-pipes M, provided with stop-cocks O. (Shown in Fig. 1.)

The operation can now be understood. Vapor is supplied to the fixing-retorts through the pipe P. It may happen that this pipe and the stand-pipe D contain air. In case such air passes into the fixing-retort in company with the entering vapor, an explosion would occur. I therefore have attached the purge-pipes M, provided with stop-cocks O. These pipes M remain open until all the air has been driven out, when they are closed.

In case the valves A and B are open the gas passes down through the pipes D, through the retorts, and out at the back, thereby being fixed or converted into a permanent gas.

In case the upper retorts, R′, should be in any way injured the valve B is closed, when the gas passes by such retort and through the other retorts of the series.

In case a whole bench should be burned out the valve A should be shut, when the gas passes along the pipe P without entering that series.

Suitable means are provided at the other end of the apparatus to prevent the return of the gas.

What I claim as my invention, and desire to secure by Letters Patent, is—

1. In a bench of fixing-retorts consisting of two or more series of retorts, the combination, with each series of retorts, of a common supply-pipe, connecting each series with a main supply-pipe, each retort being provided with a valve, and each supply-pipe connected with each series being provided with a separate valve, by means of which said series may be cut off from all other series, substantially as described.

2. In combination with a supply-pipe and series of fixing-retorts, a purge-valve, by means of which the supply-pipe may be purged of air before the admission of gas, substantially as described.

THOS. F. ROWLAND.

Witnesses:
S. F. SULLIVAN,
WM. J. SAWYER.